M. W. KIDDER.
Gas-Making Process.

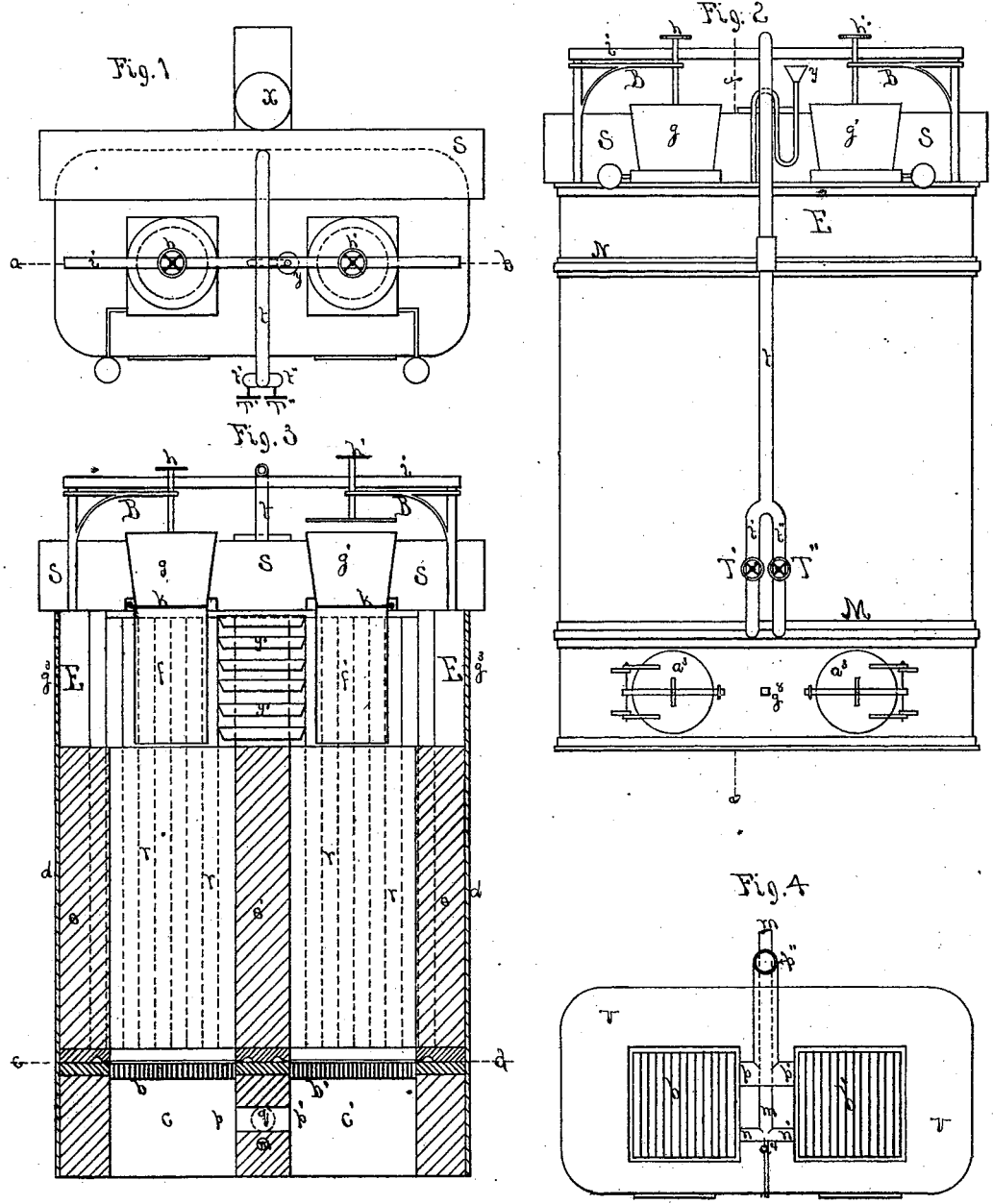

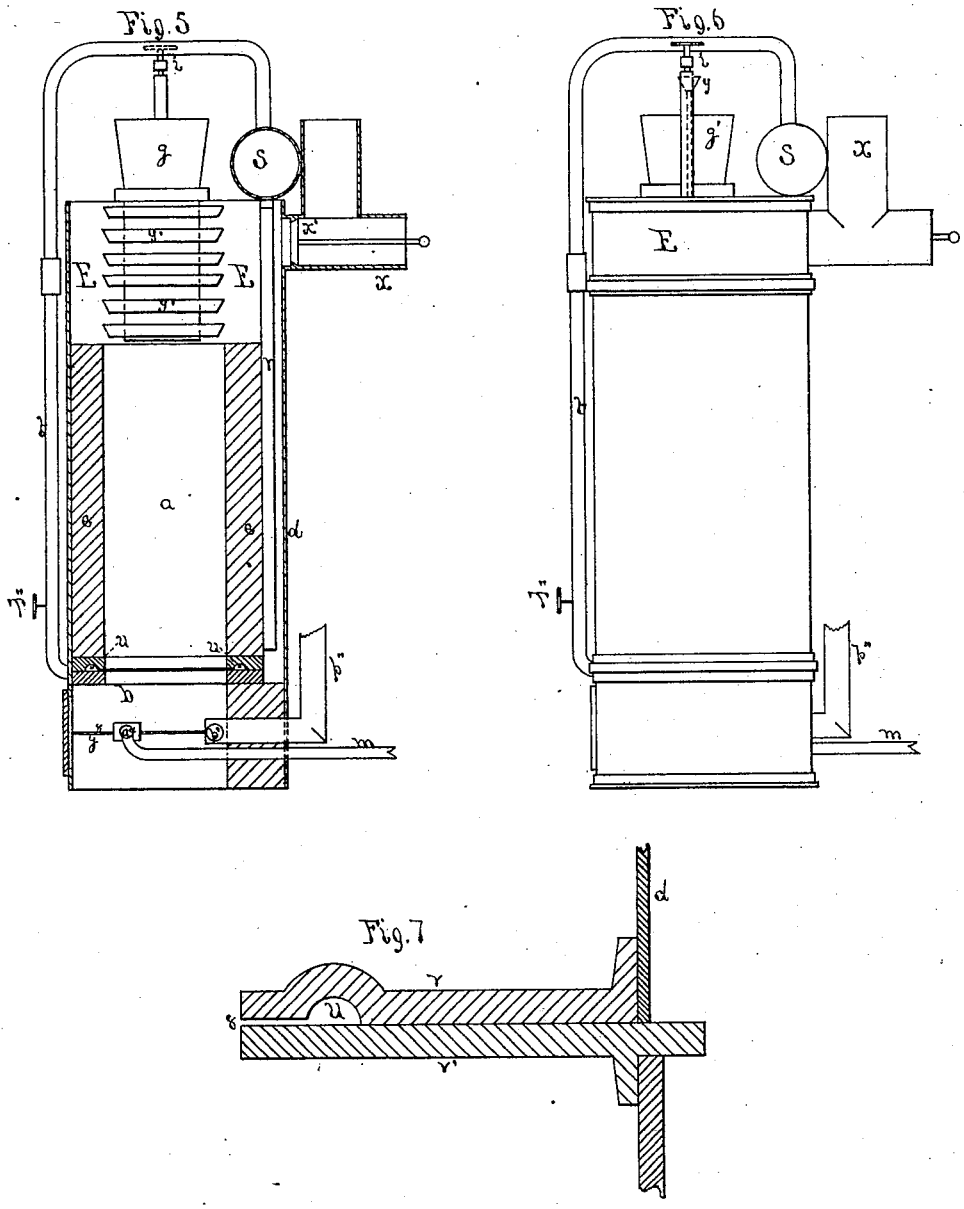

No. 164,093.

3 Sheets--Sheet 3.

Patented June 8, 1875.

Witnesses.
Wm S. Brown
John E. Crane

Inventor.
Moses W. Kidder

UNITED STATES PATENT OFFICE.

MOSES W. KIDDER, OF BOSTON, ASSIGNOR OF ONE-HALF HIS RIGHT TO PERSON NOYES, OF LOWELL, MASSACHUSETTS.

IMPROVEMENT IN GAS-MAKING PROCESSES.

Specification forming part of Letters Patent No. 164,093, dated June 8, 1875; application filed November 2, 1874.

*To all whom it may concern:*

Be it known that I, MOSES W. KIDDER, of Boston, in the county of Suffolk and State of Massachusetts, have invented certain new and useful Improvements in the Process of Manufacturing and Purifying Gas for Illuminating and Gas for Heating Purposes, of which the following is a full, clear, and exact description, reference being had to the accompanying drawings, making part of this specification, and intended to illustrate and to better explain the process, said drawings representing the apparatus and certain modifications thereof which I use in practicing and effecting said process.

Figure 8:
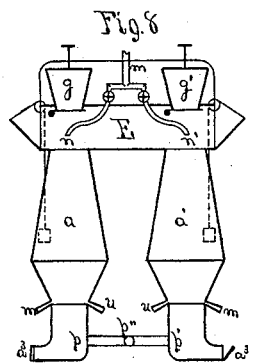
Figure 9:
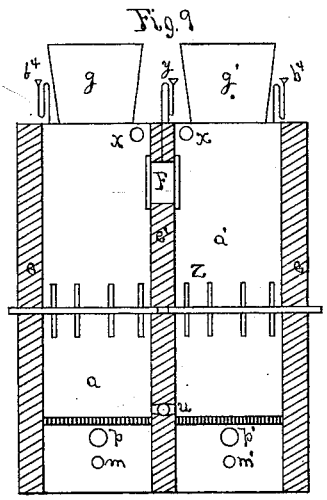
Figure 10:
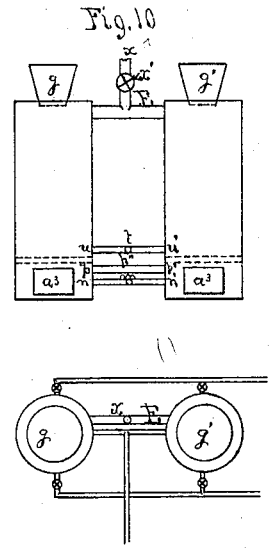
Figure 11:
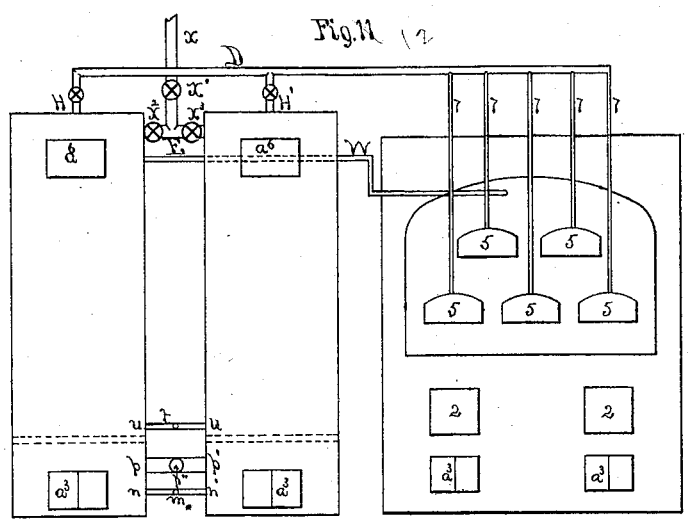

Of the said drawings, Figure 1 represents a top or plan view; Fig. 2, a front side elevation; Fig. 3, a vertical section on the line $a\,b$ of Fig. 1. Fig. 4 is a horizontal section on the line $c\,d$ of Fig. 3, or on a level with the tops of the grates. Fig. 5 is a vertical section on the line $e\,f$ of Figs. 2 and 3. Fig. 6 is an end elevation. Fig. 7 is a modification of the steam-conduit. Fig. 8 is a modification of my gas-generating apparatus or furnace, having the two combustion-chambers $a$ and $a^1$ connected at their upper ends by a trunk, E, as the means of conducting the gases in one chamber over and downward to and through the other, and without which trunk the apparatus would be inoperative to produce the process. Fig. 9 is a modification of the gas-making furnace, wherein the gas passes from one chamber, $a$, to the other, through a screen-covered tube or opening, F, in the upper part of the middle wall $e'$, and wherein hydrocarbon is introduced through a pipe, $y$, or through either of two pipes, $b^4$, each directly over one of the chambers $a\,a^1$. Fig. 10 is a front side elevation, and Fig. 11 a plan or top view, of a modified furnace, composed of two cylinder-furnaces, connected together by a pipe, E', as a substitute for the trunk E. Fig. 12 represents a modified apparatus, in which coal is distilled or roasted in retorts in the usual way, and the products conveyed through pipes to furnaces, and downward through incandescent coal to screen and purify the gas.

This invention has for its object the production of gas for illuminating and gas for heating purposes, or for the reduction of ores, and at the same time to screen and purify such gas within and previous to passing it from the gas-making apparatus, or during the process of making and fixing such gas, whether made from one kind of coal or carbon or another, or of more than one kind, or mixed and combined with liquid or vapor or vapor of hydrocarbon during the process, as the several kinds of carbon are substitutes for each other. This invention also has for its object to utilize the gas-making substances—carbon or coals and hydrocarbon—by converting the whole of such coal and the products usually distilled from coal, with the hydrocarbon, into gas and ashes, and purifying the gas from carbonic acid, and avoiding the ordinary residual matters, coke and tar.

This invention consists, first, in the process, substantially as herein described, of generating and combining gases from burning coal with volatilized hydrocarbon, and producing fixed illuminating-gas and purifying the fixed gas by means of steam and air introduced into an apparatus or furnace beneath, and passed upward through burning coal, and passing the products of the steam, air, and coal combined, or the gases resulting from the combustion, upward to or near the top of the furnace, and into and through a trunk, E, where they mingle with the vapor of hydrocarbon, either roasted from bituminous coal near the top of the combustion-chambers, or introduced in the form of vapor or of liquid through the pipe $y$, and vaporized in the trunk; thence passing the mingled gases and the hydrocarbon vapors, or the whole product of the coal, steam, air, and hydrocarbon, downward through a second trunk-connected furnace or compartment, and through incandescent coal, where it is screened and purified by the coal and heat alone, without other chemical agency, and then passed through a subjacent grate to and through the ash-pit to a gas-holder, the gas-producing coal in each gas-generating compartment or furnace serving alternately as a purifier for the gas generated in the other trunk-connected compartment or furnace, substantially as herein described.

This invention also consists of the process, substantially as herein described, of generating and purifying gas from burning coal by means of steam and air introduced into an apparatus or furnace beneath, and passed upward through the burning coal; then by passing the whole product of the steam, air, and coal combined, or the gases resulting from the combustion, upward to or near the top of the furnace—say into and through a trunk, E; thence downward through a second trunk-connected gas-generating furnace or compartment, and through a body of incandescent coal therein, where the gas is screened and purified by the coal and heat alone, without other chemical agency, and then passed to the gas-holder, as before described.

In thus operating my apparatus, I change the direction and current of the gas from one generator to the other, and vice versa, say about every hour, or as often as it is found necessary, and the gas-producing coal in each gas-generating furnace or compartment serves alternately as a screen or purifier for the gas generated in the other compartment, and passed from one to the other, substantially as described.

This invention also consists of the process, substantially as herein described, of purifying gas by alternately passing the gas from one gas-generating apparatus or compartment upward through an upper trunk, E; thence downward through a body of incandescent coal in another trunk-connected gas-generating compartment, changing the direction and the current of the gas from one gas-generator to the other, and vice versa, and thus causing the gas-producing coal in each gas-generating furnace or compartment to serve alternately as a purifier for the gas generated in the other compartment and from the purifier, substantially as described.

In order to practice and effect my improved gas-making and gas-purifying process successfully there must be brought into use some kind of apparatus or furnace wherein the coal can be burned or roasted, and steam and air introduced, as also hydrocarbon, when making illuminating-gas, and, finally, the means for screening and purifying the gas; and for this purpose I employ the apparatus or furnace, or the modifications thereof, clearly shown in the drawings; and preparatory to instituting my said improved process I close both ports $p$ $p'$ by the valve $q$, and so turn the cock $a^4$ in the air-pipe $m$ as to close both of the inlet branch pipes $n$ $n'$. The steam-valves T' T'' also being closed, I open the doors to both of the ash-pits $c$ $c'$ and the valve $x'$ in the smoke-pipe $x$. I then introduce proper kindling materials, charcoal and anthracite, upon the grates $b$ $b'$, in sufficient quantity to insure a steady fire, and a reliable body or bed of incandescent coal upon each of the grates, to effectively act in each as a screen or purifier for gas, for the arrest and reduction of carbonic-acid gas to carbonic-oxide gas, and for the conversion of all tarry matters from bituminous coal or other hydrocarbons, with the mixed gases produced from the coal, into permanent illuminating-gas. Water is next supplied to the steam-generating bars or pipes $r$. Fire is now kindled in both of the combustion-chambers $a$ $a^1$, and when the anthracite has become well kindled or ignited the ash-pit doors are both closed and secured, and the valve in the smoke-pipe is also closed; then the valve $q$, covering the gas-port $p'$, is opened from the ash-pit $c'$. The air-cock in the pipe $m$ is now opened and a blast of air introduced through the branch pipe $n$ to the ash-pit $c$, and steam is admitted through the valve T', the pipe $t'$, and the conduit $u$, and its fissure 8, to the combustion-chamber $a$, above the grate and below the coal thereon. Bituminous coal is now introduced to both of the chambers $a$ $a^1$ through the hoppers $f$ $f'$, and hydrocarbon through the pipe $y$, either in a liquid form, to fall upon the evaporating-plates $y'$, or in the form of vapor, to mingle with the gases passing through the trunk E, from one chamber, $a$, to the other. The air-blast at the ordinary or at an elevated temperature, thrown through the branch pipe $n$ into the ash-pit $c$, passes upward between the grate-bars $b$, supplying to the burning coals near the grate oxygen in sufficient quantity to convert the carbon into carbonic acid and insure an energetic fire. The steam flowing from the fissures of the conduits $u$ upon all sides of the combustion-chambers $a$, on a level with the grate $b$, creeps upward near the lining-wall of the chamber, where the heat is most intense, abstracting heat from the wall and the adjacent burning coal, becoming itself first superheated and afterward decomposed in its passage through the incandescent coal above the coal in active combustion, its oxygen combining with the carbon to form carbonic oxide, and its hydrogen is set free, mingling with the other gases. A great advantage resulting from the admission of steam at the point described is, the fire is not checked, as it would be if the steam were admitted below the grate and mingled with the air.

The carbonic acid first formed near the grate is forced upward through a deep bed of incandescent coal, by which it is reduced to carbonic oxide. Passing upward from the combustion-chamber $a$ into the space or trunk E, above the bed of coals, is a combination of inflammable and other gases, varying in the proportion of the several ingredients, and consisting of carbonic oxide, hydrogen, nitrogen, carbureted hydrogen, and hydrocarbon vapors from the bituminous coal, and carbonic acid. These gases are all mingled with each other, and with the vapors of hydrocarbon, which are now introduced through the pipe $y$, and with an additional volume of hydrogen and hydrocarbon vapors distilled or roasted from the bituminous coal near the top of the combustion or gas-generating chambers $a$ $a^1$. All of these gases and vapors thus mingled, having no other possible escape, are driven downward through the combustion or gas-generating chamber $a^1$, which, being filled with incandescent coal, and not supplied with air, acts as a gas screen and purifier, and to arrest any carbonic acid which may have escaped from the chamber $a$, and demands half its oxygen, thus reducing it to carbonic oxide, and insuring against the possible presence of carbonic acid in the ultimate product; and, further, for the arrest of all tarry matters distilled from the bituminous coal, or other hydrocarbons, and their conversion in combination with the gases produced from the various forms of carbon employed, together with the steam and air, into fixed and incondensable gas, possessing the power or capacity for heating, or for illuminating, proportionate to the supply of appropriate elements or ingredients producing the gas. The fixed gas, being driven down through the grate $b^1$ into the ash-pit $c'$, escapes, through the ports $p'$ $p''$ and connecting-pipes, to the hydraulic main. After continuing the process for a time, the fire in the chamber $a^1$ gets low, as it receives no oxygen to keep it alive, except from the carbonic acid. The fire in the chamber $a$ is at this time in an intense state of ignition. I now close the valve $T'$, shutting off the steam; next in order I close the cock $a^4$ in the air-pipe $m$, and then the valve $q$ of the gas-port $p'$, and open the valve $q$ of the gas-port $p$, and the steam-valve $T''$, and the cock $a^4$ in the pipe $m$, to admit air through the branch pipe $n'$ into the ash-pit $c'$, by which operations I reverse the currents of the gases in the combustion-chambers, so that the primary compartment in the first of the operation becomes the secondary, and the secondary compartment in the first of the operation becomes the primary, when the currents are so reversed.

Thus, by reversing the currents at proper intervals, and by supplying coal through the hoppers $f$ $f'$, and by the removal of ashes from the ash-pits, I am enabled to keep up my fires, and to continue my process perpetually.

In practicing my said process it is not necessary to let the fires go out when the day's work is done, but merely close the air-cock, and the gas-ports, and steam-valve, and open the valve $x'$ in the smoke-pipe $x$, open the ash-pit doors a little, and the apparatus is converted into an air-tight stove for the night, and the process ceases. In the morning clear the ashes from the ash-pits, supply coals and hydrocarbon, and proceed, as before stated, with the production of gas without further delay.

It will be observed that I use charcoal, anthracite, bituminous coal, and hydrocarbons in the production of illuminating-gas. This becomes necessary only in the smaller apparatus, where bituminous coal, if used alone, would be likely to melt into large coherent masses, so as to clog the combustion-chambers, and not settle down upon the grates, so as to form a suitable and compact bed or screen of incandescent coal for efficient work in screening and purifying the gas, in arresting the carbonic acid and the tarry products from the bituminous coal, and their conversion into illuminating-gas. The charcoal is used as the most reliable for arresting and decomposing carbonic acid and ammonia, the anthracite to insure a steady fire, and by its weight to carry down the masses of coke resulting from the roasting of bituminous coal in the upper part of each combustion-chamber, the bituminous coal for the rich hydrocarbons it contains, and, lastly, the liquid or vapid hydrocarbons through the pipe $y$, to supply any deficiency in illuminating quality that might result from the small proportion of bituminous coal employed, in comparison with the large volume of gas produced from the anthracite, coke, and charcoal combined with the air and steam, although the whole of the tarry products are converted into gas, and are very efficient in rendering carbonic oxide and hydrogen capable as illuminating-gases when combined with them.

In apparatus with grates two or three feet square, and combustion-chambers built smaller at the top, and gradually enlarging to the grates, bituminous coal may be used alone, as it will settle down upon the grates without the liability to obstruction presented in smaller furnaces. Thus the coke resulting from the roasting of the bituminous coal in the upper part of each combustion-chamber is converted near the grate, upon the primary side, by the oxygen of the air and steam, into carbonic oxide, and upon the secondary side it forms a suitable body of incandescent coal, to convert the mixed gases and hydrocarbon vapors passing down through it into fixed illuminating-gas, and purifying the gas, and leaving no residue of tar or coke.

In practicing my improved process with either modified apparatus shown, the same general rules are to be observed as when practicing with the apparatus first described. In all cases the gas is generated in one apparatus, or in one part of the apparatus, and passed into and through another part, and downward through incandescent coal.

When practicing my improved process with the modified apparatus shown in Fig. 8, the process is very potent for reducing iron and other ores introduced into the combustion-chambers $a$ and $a^1$ between layers of coal, since the waste heat and gases from one chamber, $a$, are carried into and through the other, and in the onward passage of such heat and gases, carbonic oxide abstracts oxygen from the metallic oxides, thus reducing the oxides to a metallic state.

I claim as my invention—

1. The process, substantially as herein described, of generating and combining gases from burning coal with volatilized hydrocarbon and producing fixed illuminating-gas, and purifying the fixed gas by means of steam and air introduced into an apparatus or furnace beneath and passed upward through burning coal, as specified, and by liquid or vapor of hydrocarbon introduced at or near the top of the furnace and mingled with the first-named gases, as set forth; then by passing the whole product of the coal, steam, air, and hydrocarbon combined, or mingled gases and vapors, downward through the incandescent coal, the gas-producing coal in each gas-generating compartment or furnace serving alternately to purify and combine the gas generated in the other compartment, substantially as described.

2. The process, substantially as herein described, of generating and purifying gas from burning coal by means of steam and air introduced into an apparatus or furnace beneath, and passed upward through the burning coal, as specified; then by passing the gases or whole product of the steam, air, and coal combined, from one gas-generating apparatus or compartment through an upper trunk, E, and downward through incandescent coal in another trunk-connected gas-generating compartment, changing the direction and current of the gas from one generator to the other, and vice versa, and causing the gas-producing coal in each gas-generating furnace or compartment to serve alternately as a purifier for the gas generated in the other compartment, substantially as described.

3. The process, substantially as herein described, of purifying gas by alternately passing the gas from one gas-generating apparatus or compartment, through an upper trunk, E, and downward through incandescent coal in another trunk-connected gas-generating compartment, changing the direction and current of the gas from one gas-generator to the other, and vice versa, and causing the gas-producing coal in each gas-generating furnace or compartment to serve alternately as a purifier for the gas generated in the other compartment, substantially as described.

MOSES W. KIDDER.

Witnesses:
JOHN E. CRANE,
WM. S. BROWN.